March 27, 1956     E. J. HERBENAR     2,739,851
SHAFT BEARING MOUNTING
Filed Dec. 24, 1952
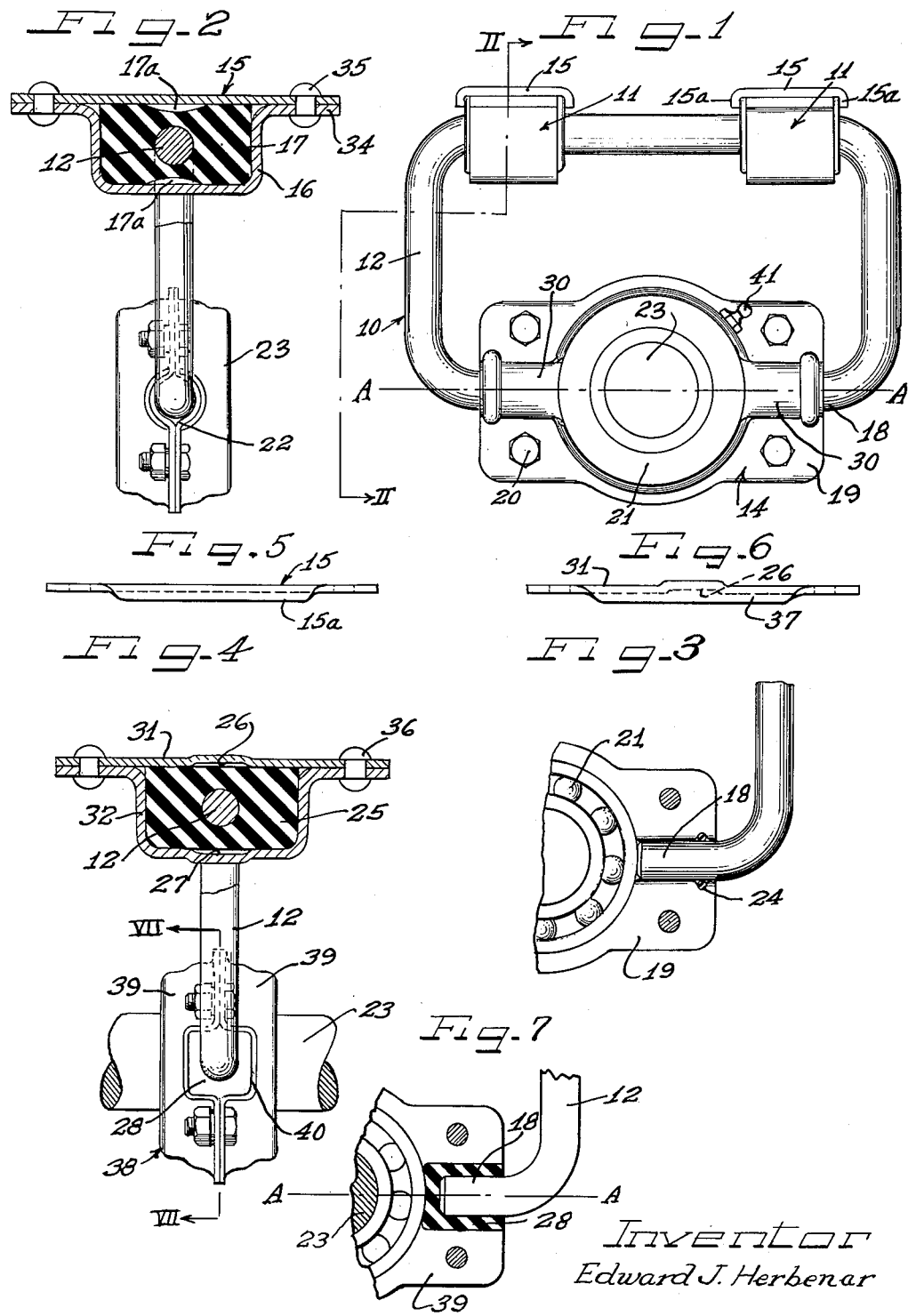
Inventor
Edward J. Herbenar United States Patent Office 2,739,851
Patented Mar. 27, 1956

2,739,851

SHAFT BEARING MOUNTING

Edward J. Herbenar, Detroit, Mich., assignor to Thompson Products, Inc., Cleveland, Ohio, a corporation of Ohio Application December 24, 1952, Serial No. 327,760

2 Claims. (Cl. 308—28)

This invention relates to a shaft bearing mounting assembly, and more particularly to a hanger assembly for a shaft bearing housing having new and improved features for increasing dampening characteristics.

Heretofore, in supporting a shaft bearing housing on a rigid frame or beam by a hanger assembly or the like, it was found that the vibrations induced in the shaft bearing housing were transmitted through the hanger assembly to the supporting frame or beam. The transmission of these vibrations was found to have a deleterious effect on the supporting frame structure with the result that the structure was seriously weakened and rendered unsafe. In the case of a machine or vehicle, such as, for example, an automobile, these vibrations caused discomfiture, limited its usefulness, and, in some instances, rendered it unsafe.

To the end that the transmission of these induced vibrations may be reduced or eliminated, it is therefore the purpose of this invention to provide a simplified hanger structure which is so constructed and arranged as to increase the absorbing capacity and dampening characteristics of the hanger assembly.

It is then an object of this invention to provide an improved mounting for a shaft bearing housing which will have a simplified pivot pin construction and which will have increased vibration dampening characteristics.

It is a further object of this invention to provide an improved mounting for a shaft bearing housing including parts constructed and combined for coaction with each other and affording a simplified, sturdy, low cost construction which can be readily attached to or detached from a hanger support with a minimum of time, effort and skill.

It is a further object of this invention to provide a shaft bearing mounting assembly incorporating features of construction with a minimum number of parts, with a view to increasing the vibration dampening characteristics of the assembly, and either eliminating the provision of separate resilient bushings for retaining the ends of the hanger in the shaft bearing housing, or having such resilient bushings without the necessity for providing relief spaces in the bearing housing.

Other and further important objects of this invention will become apparent from the following description and the appended claims.

As shown on the drawings:

Figure 1 is a front elevational view of the shaft bearing mounting assembly embodying the preferred form of the invention;

Figure 2 is a transverse cross-sectional view taken along the broken line II—II of Figure 1;

Figure 3 is a fragmentary front elevational view of the shaft bearing housing shown in Figure 1 with the front shell removed to show underlying parts;

Figure 4 is a view similar to Figure 2, showing a modified form of the invention;

Figure 5 is an end elevational view of a mounting strap shown in Figure 1;

Figure 6 is an end elevational view of a modified form of mounting strap shown in Figure 4; and Figure 7 is a sectional view taken along the line VII—VII of Figure 4.

On the drawings:

In Figure 1, the reference numeral 10 represents a hanger assembly for a shaft bearing housing constructed in accordance with the invention. The hanger assembly is essentially comprised of a pair of upper mountings or strap assemblies 11, a bail or hanger structure 12 which is supported at its upper or bight portion by the strap assemblies, and a shaft bearing housing 14 pivotally carried at the lower ends of the hanger. The hanger assembly, for present purposes, may be a part of the chassis or frame of an undercarriage, such as an automotive vehicle or the like, although it is susceptible of use in mechanisms other than automotive vehicles.

The mounting assembly 11, which supports the hanger structure, is comprised of a pair of metal straps 15, 16, which are bolted or riveted to their associated chassis frame or beam (not shown). The strap 15 is of channel form having depending flanges 15a and straddling strap 16. This latter strap is generally V-shaped, having outwardly turned ends 34 which are riveted or bolted, as at 35, to upper strap 15, to define a loop or encasement for retaining therein a hollow resilient bushing or rubber block 17.

The bushing 17 is of rectangular shape and is composed of natural rubber, or synthetic rubber such as neoprene, and provided with a central longitudinal opening for supportingly engaging hanger 12. An arcuate groove 17a in the upper and lower faces of the bushing functions as a relief or clearance space, which, when the bushing is assembled, increases the capacity of the bushing for absorbing induced vibration which may be transmitted from the bearing housing as will hereinafter appear.

The hanger 12, which is received in the hollow of bushing 17, and is pivotally suspended from the strap assembly, is of C-shaped form and includes inclined inwardly bent ends 18.

The bearing housing 14 includes a pair of metal stampings or plates 19 bolted together by bolts 20 to house a ball bearing race or journal 21. This bearing supports a rotating shaft 23 freely journaled in the ball bearing. Each stamping 19 has formed at opposite ends thereof a semi-cylindrical portion 30, which, when the stampings are brought into assembled relation, provide oppositely directed, aligned end sockets for rotatably receiving the inwardly bent ends 18 of hanger 12. In this manner the bearing housing is adapted to swing about an axis A—A defined by the longitudinal axis of ends 18 (see Figure 1).

The bearing housing is lubricated by means of conventional grease fittings 41 and provision is made in each of the end sockets of the bearing housing for the reception of an O-ring 24 for sealing or retaining lubricant in the bearing housing and for preventing the entry of foreign material therewithin.

The O-ring 24 is composed of a plastic or rubber material which is adapted to conform to the recess within which it is positioned and has the further characteristics of resiliently yielding and contracting about a metal rod or shaft when such an element, as end 18, is forced therethrough.

As illustrated in Figures 1 and 2, the bail structure or hanger 12 is pivotally anchored in the straps 15, 16 by bushings 17. The inwardly bent ends 18 of the hanger 12 are aligned and adapted to be pivotally received in metal to metal contact in the aligned socket openings at opposite ends of shaft bearing housing 14. In this manner the hanger pivotally supports the shaft bearing housing 14 about an axis A—A. The bearing housing is permitted to rock about this axis while the absorption of such motions and vibrations in the bearing housing incident to the rotation of the shaft 23 is effectuated by mounting assemblies 11.

In operation, the rubber bushings 17 are designed to absorb induced vibrations transmitted to the hanger assembly as a result of forces acting upon the rotating shaft 23. For this purpose, the arcuate grooves in the upper and lower faces of the bushings 17 provide clearance or relief spaces between the bushings and the encasing straps 15, 16, for affording deflection or distortion of the rubber of the bushings within the encasing loop of the straps. In this manner the bushings 17, when subjected to deforming forces, such as might arise from vibrations transmitted through the hanger assembly, tend to fill the aforesaid spaces while the resilient material of the bushings is confined at the outer edges of the straps. The central grooved portions lie in planes including the plane of the hanger 12, in which maximum vibrations would tend to occur, and therefore aid in dampening such vibration. Obviously, the amount of relief provided between the bushings and straps determines the dampening characteristics of the mountings.

In Figure 4 is represented a modified form of mounting assembly comprised of a pair of metal straps 31, 32 similar to the straps 15, 16 of Figure 2, but provided with indentations or recessions 26, 27 in the corresponding straps. A resilient hollow rubber bushing or block 25 is encased within the straps 31, 32 and retained therein by the depending flanges 37 of strap 31. The recessions 26, 27 in the straps 31, 32 afford clearance or relief spaces between the strap casings and the resilient material of the bushings to the same extent as the grooves 17a in the bushings 17 of the form depicted in Figure 2 and likewise accommodate distortion of bushings in the plane of major movement of the hanger assembly.

The modification illustrated in Figures 4 and 7 is further characterized by the provision of a bushing 28 formed of elastic material, such, for instance, as natural or synthetic rubber or other elastic plastic, for resiliently pivotally supporting the bearing housing about the pivot axis A—A. In this modification the shaft bearing housing 38 is comprised of a pair of metal stampings or plates 39, each stamping 39 having formed at opposite ends thereof a deep rectangular channel 40, which define end sockets of rectangular shape when the metal stampings 39 are bolted together.

A bushing 28 fits within each of the end sockets of shaft bearing housing 38. Bushing 28 is of rectangular shape and has formed at one end thereof a cylindrical recess terminating in a blind end, which is adapted to receive an inwardly bent end 18 of hanger 12. In this situation, the metal to metal contact of the shaft bearing housing 38, as it rocks about axis A—A, is obviated, since the bearing housing 38 and bushing 28 pivot as a unit about axis A—A. No provision is made for a clearance or release space in this resilient mounting and under these circumstances there is little, if any, vibration dampening properties in the resilient bushing 28.

From the foregoing description it will be apparent that the driven shaft 23 is adapted to be supported by the shaft bearing housing and is free to rock about the axis A—A formed by the inwardly bent ends 18 of hanger 12. At the same time any induced vibrations set up in the hanger assembly as the result of forces acting upon the driven shaft 23 or as an incident to the rotary motion of the shaft, is dampened by reason of the clearance or relief spaces provided between the bushings and the encasing straps thereof. In the modified version of my invention shown in Figure 2, these relief spaces are formed between adjoining surfaces of the straps and bushings by the central grooves 17a in the upper and lower faces of the bushings 17. In Figure 4, is shown a modified arrangement in which the recessions 26, 27 in the straps 31, 32, afford sufficient clearances between the bushings 25 and the retaining straps to absorb any deformation of the resilient bushings that may occur in the plane of the hanger. In either form of my invention, the clearance spaces between the resiliently deformable material of the bushing and the confining straps lie in planes including the plane of the hanger 12 in which major movement or vibration would more likely occur, and therefore aid in dampening such vibration.

In summary, in both versions of my improved hanger assembly, the pivot axis A—A, formed by the inwardly bent ends 18 of hanger 12, simply functions as a pivot with little or no vibration dampening properties, but the upper mounting includes a resilient material which is sufficiently relieved within its surrounding encasement to properly dampen vibrations transmitted therethrough.

It will be understood that modifications and variations may be effected without departing from the scope of the novel concept of the present invention.

I claim as my invention:

1. In a hanger assembly, a support mounting, a C-shaped bail structure having the bight thereof swingingly carried by said mounting, a resilient material retained in said mounting and surrounding said bight, a pair of depending arms on said bail, aligned inwardly bent ends on said arms, a shaft bearing housing, aligned sockets at opposite ends of said housing for pivotally receiving said aligned ends, and an O-ring in each of said sockets for retaining lubrication in said housing, said support mounting comprising a pair of metal straps encasing said resilient material, said straps having recesses on their inner surfaces on either side of said bight and parallel thereto to provide clearances between said resilient material and the encasing straps and thereby to improve the vibration dampening characteristics of the assembly.

2. In hanger assembly including mounting means, a shaft bearing housing and a bail structure suspended from said mounting means and pivotally supporting said shaft bearing housing, the improvement in said mounting means which comprises a bushing block of resilient material having a bore therethrough receiving the bight of said bail structure and a pair of straps of rigid material conformingly enclosing said block but providing relatively offset portions parallel to said bore to provide clearance spaces with respect to said block in the plane of said bail structure and that serve to dampen the transmission of vibrations through said hanger assembly.

References Cited in the file of this patent

UNITED STATES PATENTS

| | | |
|---|---|---|
| 1,808,365 | Masury | June 2, 1931 |
| 2,304,595 | Prentice | Dec. 8, 1942 |
| 2,450,279 | Guy | Sept. 28, 1948 |
| 2,525,911 | Keene et al. | Oct. 17, 1950 |
| 2,580,119 | Meyers | Dec. 25, 1951 |

FOREIGN PATENTS

| | | |
|---|---|---|
| 629,502 | Great Britain | Sept. 21, 1949 |